United States Patent [19]
Oliver

[11] 3,835,655
[45] Sept. 17, 1974

[54] METHOD AND APPARATUS FOR CONNECTING SUBSEA FLOW LINES

[75] Inventor: John P. Oliver, Houston, Tex.

[73] Assignee: Cameron Iron Works, Inc., Houston, Tex.

[22] Filed: June 27, 1972

[21] Appl. No.: 266,701

[52] U.S. Cl.................. 61/72.3, 166/.6, 285/18, 285/24
[51] Int. Cl............................................. F16l 35/00
[58] Field of Search .............. 61/72.3, 72.1; 166/.6, 166/.5; 285/18, 23, 24

[56] References Cited
UNITED STATES PATENTS

| | | | |
|---|---|---|---|
| 3,459,442 | 8/1969 | De Yarmett et al.............. | 166/.6 X |
| 3,592,014 | 7/1971 | Brown.................................. | 61/72.1 |
| 3,658,366 | 4/1972 | Welch, Jr.......................... | 61/72.3 X |
| 3,701,261 | 10/1972 | Nolan, Jr. ........................... | 61/72.3 |
| 3,710,859 | 1/1973 | Hanes................................... | 166/.6 |

*Primary Examiner*—Jacob Shapiro

[57] ABSTRACT

Apparatus and method are disclosed for remotely joining two subsea flow lines, such as two portions of a subsea pipeline. One of the pipeline portions is generally laid prior to connection with the other pipeline portion and a first marker buoy detachably supports a tow line portion passing from the marker buoy, through a guide member mounted on an end of said one pipeline portion and back to the marker buoy. A second tow line portion is connected between an end of the other pipeline portion to be laid and a second marker buoy. During the pipeline connection operation, the tow line portions are connected together, the to-be-laid pipeline portion lowered in the water until adjacent the first laid pipeline portion, and the connected tow line pulled until the pipeline portions are joined. Mating parts of a remotely actuated collet connector are provided on the ends of pipeline portions to be joined, and these parts are guided into place during joining for providing a sealed connection.

11 Claims, 7 Drawing Figures

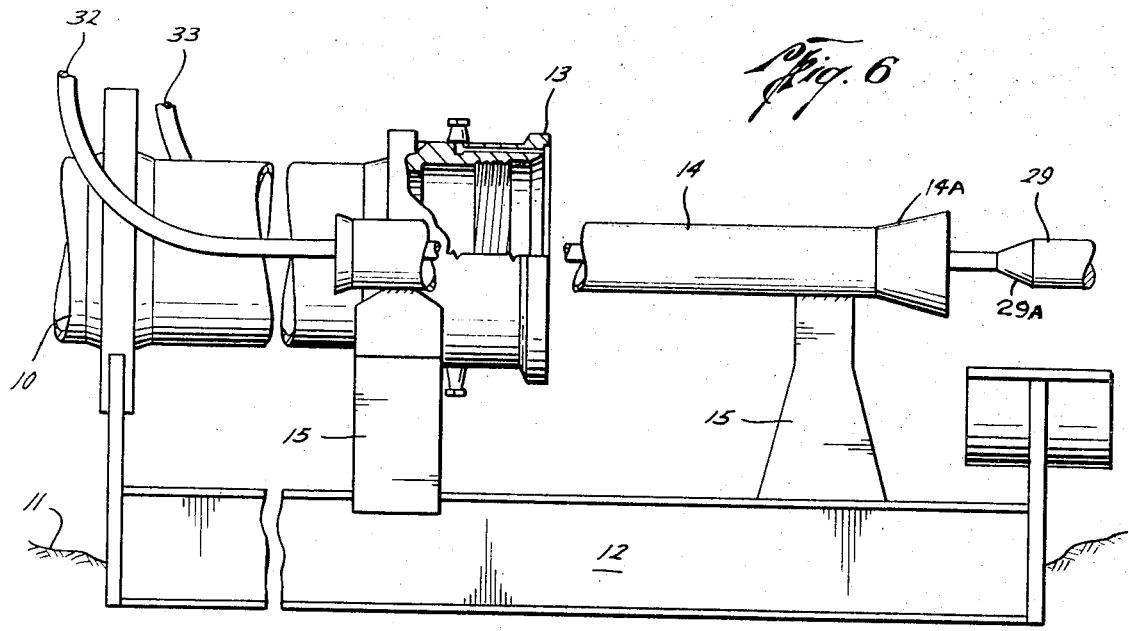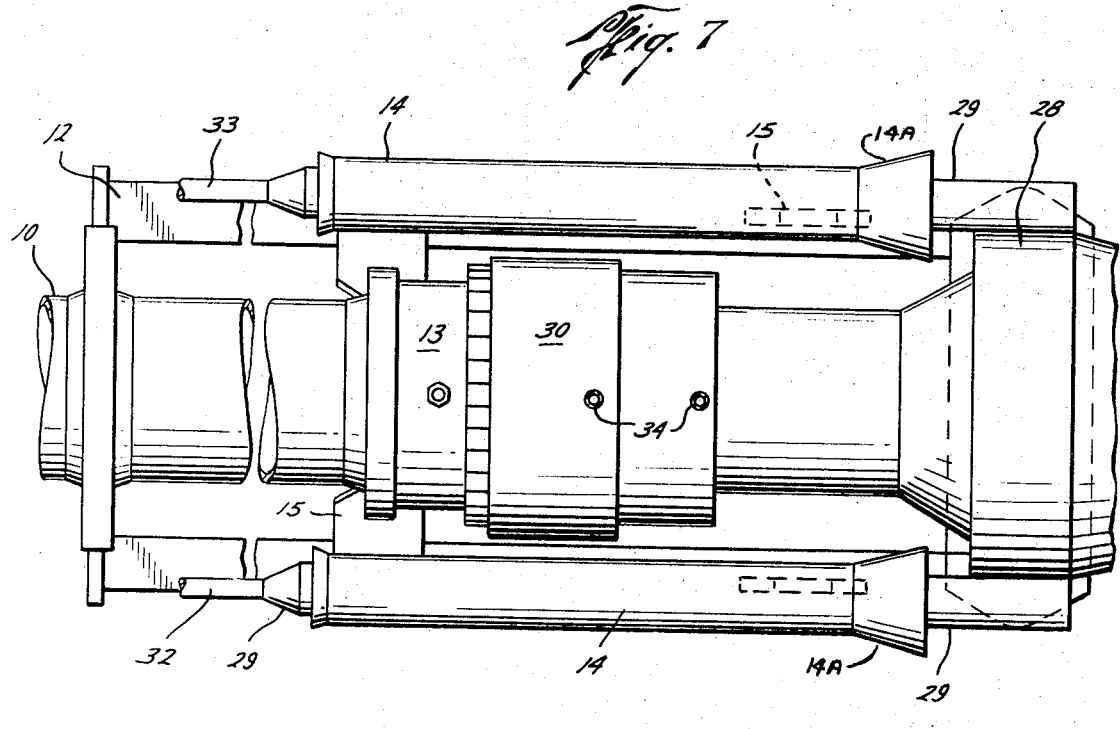

METHOD AND APPARATUS FOR CONNECTING SUBSEA FLOW LINES

This invention relates to method and apparatus for remotely joining subsea flow lines, particularly portions of a subsea pipeline.

In the past, various apparatus and methods have been suggested for connecting an end of a subsea pipeline or portion thereof to an end of another subsea pipeline or pipeline portion which may have been previously laid. For example, in U.S. Pat. Nos. 3,204,417 and 3,267,682, the pipeline or pipeline portion to be laid and connected to previously laid pipeline portion is lowered from the water's surface to the sea bottom in a large carriage suspended by a derrick barge. Guiding of the pipeline portions together during the joining operation is provided either by a diver or by transmitting and receiving underwater radiant or television guide signals. However, uses of divers is expensive and adds an element of danger, and it is difficult to provide exact alignment by use of electronic guide signals in the hostile subsea environment. Also, the procedures set out in these patents require large and expensive pipe handling apparatus and are unsuitable for joining pipeline portions at great depths.

In U.S. Pat. Nos. 375,464, and 3,479,831, the underwater pipeline joining operation is facilitated by buoyantly supporting the pipeline portion to be laid and floating this buoyantly supported pipeline portion to the location where it is to be joined to a previously laid pipeline portion. The buoyancy of the pipeline or of separate buoys supporting the pipeline is controlled to lower the pipeline to be laid to the horizontal level of the previously laid pipeline, so that large pipe handling equipment is not required. However, these patents do not disclose any suitable means for guiding the pipeline portions together and joining them without the aid of a diver.

In U.S. Pat. Nos. 3,233,667 and 3,233,314, apparatus for joining subsea flow lines without the aid of a diver are disclosed. However, in U.S. Pat. No. 3,233,667, the guiding means is an integral part of the flow line connector and the tow cable must be threaded through a pipeline to be joined to provide guiding, and U.S. Pat. No. 3,233,314 does not disclose apparatus suitable for joining and handling long portions of relatively large pipelines.

It is thus an object of this invention to overcome the enumerated shortcomings of the prior art by providing an improved method and apparatus for remotely guiding a buoyantly supported subsea pipeline portion to and joining such a portion with a previously laid pipeline portion.

Another object of this invention is to provide such method and apparatus in which the laid pipeline portion can be prepared for such a joining operation when laid, and connection with another pipeline portion made thereto at some subsequent time without further diver attention, and without the necessity of passing a tow cable through a long pipeline portion.

Another object of this invention is to employ such apparatus which minimizes problems of misalignment that may occur during such a joining operation, is of relatively inexpensive construction, and requires no special handling equipment such as a derrick barge.

These and other objects of this invention are accomplished in accordance with the illustrated embodiment of this invention, by installing a feed-through guide member adjacent to but spaced from a connector, such as a collet hub mounted on an end of one of two pipeline portions to be joined, and providing a marker buoy connected to the end of said one pipeline portion by a tow cable portion passing from the marker buoy, through the feed-through guide member, and back to the marker buoy. The other pipeline portion to be joined to said one pipeline portion is buoyantly supported in the water and towed to adjacent the first pipeline. A second marker buoy is connected to the end of said other pipeline by a second towline portion, and preferably to a male guide member adapted to mate with the feed-through guide member. The male guide member is mounted adjacent to and spaced from an end connector on the pipeline end, such as a collet connector adapted to be connected to the collet hub and to be remotely actuated to seal the joint formed. During the joining operation, the buoyancy of the second marker buoy is decreased to lower the end of said other pipeline portion to a suitable horizontal level. The tow line portions are connected together and to a towing device, and the tow line pulled to guide the male guide member into the feed-through guide member, and to join the collet parts together. Once the connection is completed, the collet seal can be actuated to effect closure.

In the drawings, wherein is illustrated a preferred embodiment of this invention and wherein like reference numerals are used throughout to designate like parts, FIG. 1 is a view in elevation showing a laid pipeline portion and a buoyantly supported pipeline portion and the preferred form of supporting and joining apparatus of this invention, prior to joining of the pipeline portions;

FIG. 6 is a partial cut-away view in elevation of a tie-in base for supporting the laid pipeline portion, shown just prior to joining of the pipeline portions;

FIG. 7 is a top view of the apparatus of FIG. 6, shown with the pipeline portions joined.

Figure 1:
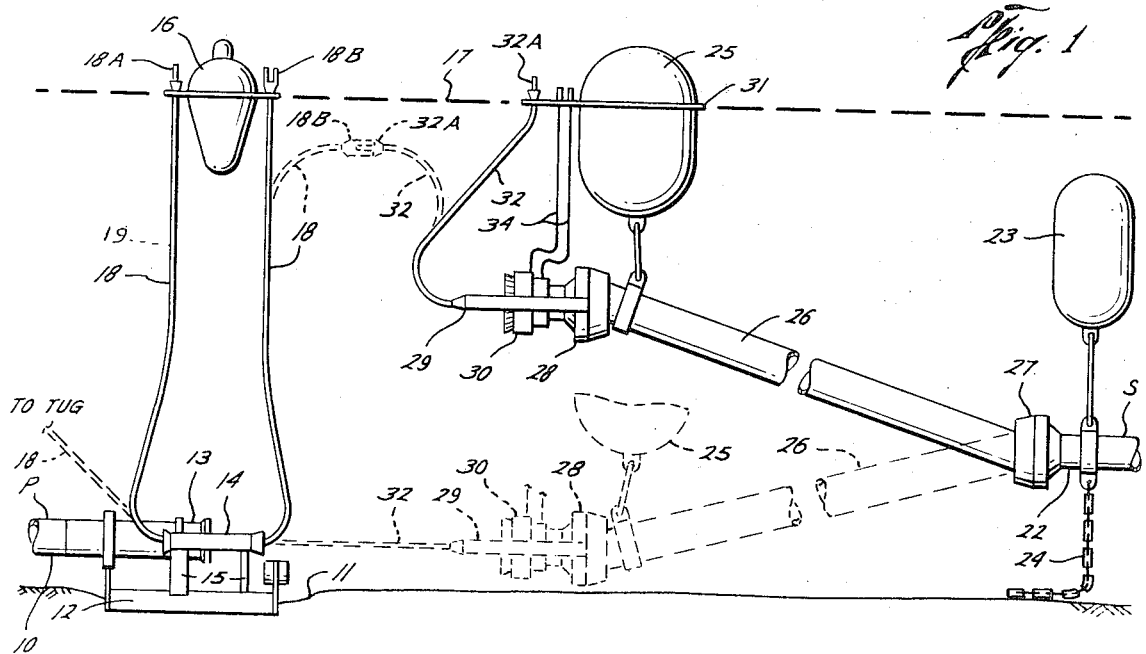

Referring now to FIG. 1, and end 10 of a laid pipeline portion P is illustrated as being supported on a sea bottom 11 by a tie-in base or frame assembly 12. Mounted on frame 12 and connected to end 10 is a collet hub 13 which may be any suitable form of hub for mating with a remotely actuable collet connector on the end of pipeline to be joined with pipeline end 10, such as shown in U.S. Letters Patent No. 3,096,999. Also connected to end 10, such as on tie-in base 12, are elongated, feed-through guide tubes 14 which are mounted on opposite sides of end 10 by supports 15. Tubes 14 are mounted adjacent to and spaced from end 10 and collet hub 13 and extend parallel to the length of pipeline end 10. As shown in FIG. 6, each of tubes 14 is flared at its end 14A away from collet hub 13 to facilitate guiding of a male guide member into it. While it is preferred that two guide tubes 14 be provided as shown in FIG. 7, sufficient guiding may be provided by one such tube mounted directly above collet hub 13.

A marker buoy 16 is also provided at or near the surface 17 of the sea to mark the subsea location of pipeline end 10. If desired, for example, where unusually heavy seas are encountered, buoy 16 can be a normally submerged retrievable buoy that can be called to the surface by a command signal.

Figure 2:
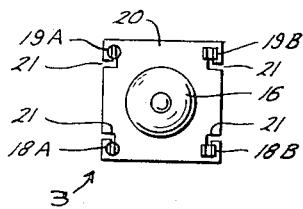
FIG. 2 is a top view of a portion of the apparatus of FIG. 1.
Figure 2:
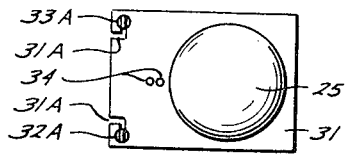
Figure 3:
FIG. 3 is an enlarged partial view taken at 3 on FIG. 2 illustrating one arrangement for detachably connecting the tow line ends to the marker buoys.
Figure 4:
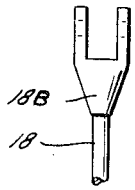
FIG. 4 is an enlarged view in elevation of one form of tow line coupling that may be used with this invention.

In either case, two tow line portions 18 and 19 are detachably connected at their ends 18A and 18B, and 19A and 19B, respectively, to marker buoy 16 and each passes from marker buoy 16, through one of guide tubes 14, and back to marker buoy 16. As illustrated in FIG. 2, buoy 16 may include a generally square base 20 mounted on it at or near its normal water line when at surface 17 and base 20 includes four slotted openings 21 at its four corners into which tow line ends 18A, 18B, 19A and 19B can be detachably supported. The details of one of the openings 21 is illustrated in FIG. 3. Opening 21 is generally L-shaped and includes an enlarged portion 21A. Ends 18A, 18B, 19A and 19B are preferably provided by cable connectors (shown in FIG. 4) which are tapered from the diameter of tow line 18 to a larger diameter so that the tapered portions will lodge in openings 21A. Thus, ends 18A, 18B, 19A and 19B will not be easily inadvertently dislodged from buoy 16, yet may be easily removed when desired. Of course, other suitable means may be provided for detachably connecting ends 18A, 18B, 19A and 19B to buoy 16. For example, the ends may be secured by bolts and nuts to base 20 and still be readily removed when desired. Also, the end connectors must be sized so that they will pass through guide tubes 14.

Figure 5:
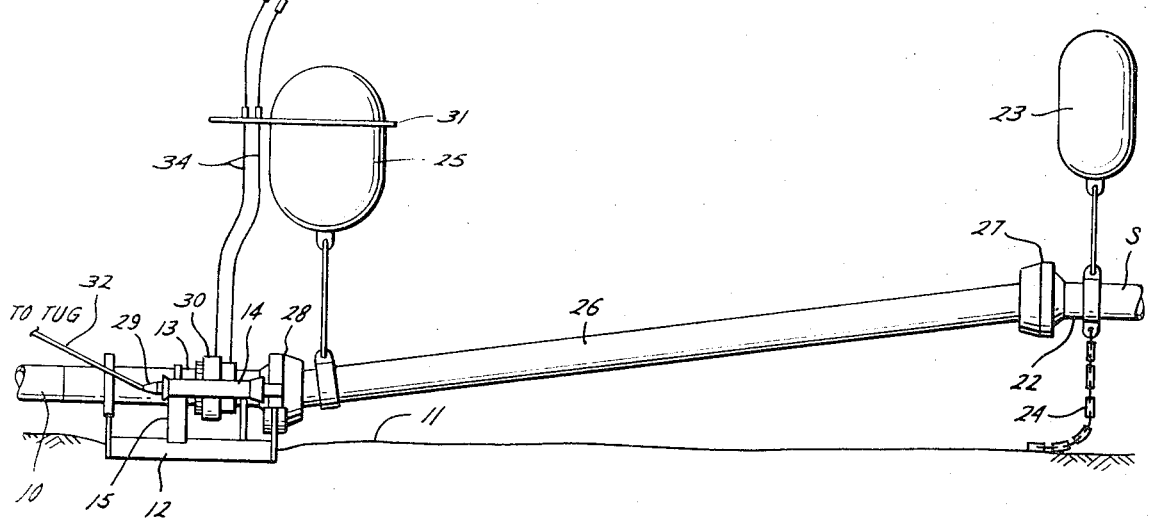
FIG. 5 is a view in elevation of the apparatus of FIG. 1 after joining of the pipeline portions.

Subsequent to the laying of pipeline portion P, a second pipeline portion S may be laid and connected for fluid communication with end 10 of pipeline portion P. In preparing for this operation, a long section of pipeline portion S, for example, 2–5 miles in length, may be prepared by connecting a plurality of individual pipe sections together and buoyantly supporting the prepared pipeline portion S submerged in the water by a plurality of buoys 23 (only one of which is shown in FIGS. 1 and 5) connected to pipeline portion S at spaced intervals along its length. Also, to stabilize pipeline portion S at a desired depth of submergence, a plurality of chains 24 may be provided (again only one such chain shown in FIGS. 1 and 5) connected to pipeline portion S at spaced intervals along its length. Pipeline S may be submerged and stabilized at a neutral buoyancy at a depth where buoys 23 are below substantial wave action and pipeline portion S may be easily pulled by a tow line to a position where it is adjacent to end 10 and in position to be joined for fluid communication with pipeline portion P.

A second marker buoy 25 is provided at or near the water surface 17 for generally marking the location of the submerged end of pipeline portion S. It is preferred that a pipe section 26 be connected at one of its ends to an end 22 of the last pipe section of pipeline portion S, through a swivel joint 27 and that marker buoy 25 be connected to pipe section 26. A second swivel joint 28 is also preferably connected to the other end of pipe section 26 and a pair of male guide members 29 and a collet connector 30 adapted to mate with collet hub 13 are also connected to this end of pipe section 26. Male guide members 29 are mounted on said other end of pipe section 26, adjacent to and spaced from collet connector 30 and the ends 29A of guide members 29 are tapered to facilitate guiding into flared ends 14A of tubes 14.

In the preferred embodiment illustrated, marker buoy 25 includes a base 31 mounted on it at or near its normal waterline when at surface 17. Base 31 includes two slotted openings 31A as shown in FIG. 2, similar to slotted openings 21. Two tow cable portions 32 and 33 (see also FIGS. 6 and 7) are connected to male guide members 29 and are detachably supported at their ends 32A and 33A respectively in slots 31A of base 31. Ends 32A and 33A may be formed by end connectors similar to end connectors 18A shown in FIG. 4, and should be adapted to be connected with end connectors 18B and 19B and to pass through guide tubes 14. Also, hydraulic lines 34 for conducting hydraulic actuating fluid to collet connector 30 may be supported at their ends on base 31 so that these lines can be connected at or near the water's surface to a source of hydraulic fluid (not shown).

Buoy 25 preferably includes means (not shown) for changing its buoyancy so that its amount of submergence in the water can be controlled. In operation, after pipeline portion S has been towed to a position adjacent pipeline portion P, the pipeline joining phase begins. As shown in dotted lines in FIG. 1, cable ends 18B and 19B are removed from base 20 and cable ends 32A and 33A are removed from base 31 and ends 18B and 19B connected respectively to ends 32A and 33A. A source of hydraulic pressure (not shown) is connected to lines 34. The buoyancy of buoy 25 is then decreased and buoy 25, connector 30 and the end of pipe 26 connected thereto lowered to a position such as shown in dotted lines in FIG. 1 where they are on substantially the same horizontal level as end 10 of pipeline portion P. If needed the horizontal level of pipeline portion S can also be lowered by decreasing the buoyancy of buoys 23. Tow lines 18 and 19 are then removed from base 20 and connected at their ends 18A and 19A respectively to a tug or tug tow line, or to a winch line, and pulled to move the male guide members 29 into guiding relationship with tubes 14 (see FIG. 6) and then pulled farther until collet connector 30 mates with collet hub 13 as shown in FIGS. 5 and 7. When fully mated the hydraulic actuator for collet connector 30 can be activated to seal the joint formed. If desired, the tow cable can be disconnected from the tug and connected back to buoy 16 which can serve as a permanent marker for the position of the joint formed.

Since the ends 14A of guide tubes 14 are flared, and the ends 29A of male guide members 29 are tapered, these parts will generally mate without much difficulty even where the tow cables are up against one side of the guide tubes 14. Also, as shown if FIGS. 6 and 7, once male guide members 29 are joined collet parts 13 and 30 are in proper alignment for joining.

Although one exemplary form of suitable collet 13–30 is shown in FIGS. 6–7, the collet may be of any suitable form for remotely providing a sealed joint between the pipeline portions. Also, where only one guide tube 14 and mating male guide member 29 is used, a single tow would be provided between a tug and member 29. Also, while buoys 16 and 25 are shown at surface 17, these buoys may also be normally submerged below wave action. While, in this case, it may be necessary to employ divers to make the tow line connections, at some relatively shallow depth, it would not be necessary to employ divers at relatively great depths during the pipeline connection phase, such as is necessary with the prior art pipeline joining methods when pipeline portions are joined at such great depths.

From the foregoing, it will be seen that this method and apparatus is one well adapted to attain all of the ends and objects herein above set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for remotely joining two subsea flow lines which are to be connected together at a substantially later time than the time at which the first laid of said flow lines is laid, comprising, in combination: guide means adapted to be mounted on the first laid of said flow lines for guiding a tow line; a first buoyantly supported member adapted to be positioned over said guide means substantially at the time that said guide means is mounted on said first laid of said flow lines and to remain in said position until substantially the time when said other flow line is connected to said first laid flow line, said member including means for detachably supporting at least one portion of such a tow line which portion is adapted, prior to joining of said flow lines, to pass from said member, through said guide means, and back to said member, and to pass during joining of said flow lines through said guide means to a towing device; and a second buoyantly supported member connected to said other flow line and including means for detachably supporting at least another portion of such a tow line which portion is adapted to be connected prior to joining of said flow lines between said other flow line and said second buoyantly supported member, and during joining of said flow lines between said other flow line and said one portion of a tow line.

2. The apparatus of claim 1 further including a collet hub adapted to be mounted on said one flow line, second guide means adapted to be mounted on said other flow line for mating with said first mentioned guide means during joining of said flow lines, and a collet connector adapted to be mounted on said other flow line for connection with said collet hub during joining of said flow lines.

3. The apparatus of claim 2 further including swivel means for providing a swivel connection between said second guide means and said other flow line.

4. The apparatus of claim 3 wherein said swivel means includes a pipe having a first swivel joint at one end for connection with said second guide means, and a second swivel joint at the other end for connection with said other flow line.

5. The apparatus of claim 1 wherein said one flow line is a laid pipeline portion and further including a tie-in base for supporting said laid pipeline portion on the sea bottom, said guide means being connected to said tie-in base, and wherein said other flow line is a subsequently laid pipeline portion and further including means for buoyantly supporting said subsequently laid pipeline portion prior to joining with said laid pipeline portion.

6. The apparatus of claim 5 wherein said guide means includes two elongated guide tubes each of which are mounted on opposite sides of said tie-in base, and are supported spaced from and adjacent to one end of said laid pipeline portion, and wherein said other pipeline portion includes two male guide members for mating with said guide tubes during joining of said pipeline portions.

7. As a subcombination, apparatus for preparing a laid subsea pipeline portion end for connection with a subsequently laid pipeline portion, comprising: a tie-in base for supporting said end on a subsea floor; an elongated feed-through guide means mounted on said base and adapted to be adjacent to and parallel along its length to said end of said laid pipeline portion, a collet hub mounted on said base for connection with said end, and a buoy supported member for detachably supporting a tow line for connection from said member, through said guide means, and back to said member.

8. The apparatus of claim 7 wherein two such guide means are provided with each being mounted on opposite sides of said tie-in base and disposed on opposite sides of said pipeline portion end.

9. As a subcombination, apparatus for preparing a buoyantly supported subsea pipeline portion for connection with a previously laid subsea pipeline portion comprising: a pipe section including a first swivel joint at one end for connection with said buoyantly supported pipeline portion and a second swivel joint at the other end; a collet connector connected to said swivel joint at said other end for connection with said laid pipeline portion; male guide means connected to said swivel joint at said other end for guiding said other end during joining of said flow lines; a buoy supported member for detachably supporting a tow line connected between said guide means and said member; and means for connecting said pipe adjacent said other end to said buoy supported member for buoyantly supported said other end in a body of water.

10. A method of joining two subsea pipeline portions comprising the steps of: mounting a feed-through guide means on an end of the first laid of such pipeline portions; passing a tow line from a marker buoy, through said guide means and back to said marker buoy and detachably connecting said tow line portion to said marker buoy; buoyantly supporting said other pipeline portion and towing said portion to position adjacent said first laid pipeline portion; connecting said tow line to a pulling device and to the end of said other pipeline portion to be joined to said first laid pipeline portion; and utilizing said pulling device to pull said tow line through said guide means until said pipeline portions are joined.

11. The method of claim 10 further including the steps of mounting a male guide means adapted to mate with said feed-through guide means on said end of said other pipeline portion; passing a tow line from said male guide means to another marker buoy; and wherein said step of connecting said first mentioned tow line to said end of said other pipeline portion is provided by connecting said first mentioned tow line to said second mentioned tow line.

* * * * *